July 15, 1952

A. A. WILLIAMS 2,603,291

MATERIAL GUIDE FOR SHEARING MACHINES

Filed March 5, 1949

INVENTOR
A.A.WILLIAMS
BY
W.C. Parnell
ATTORNEY

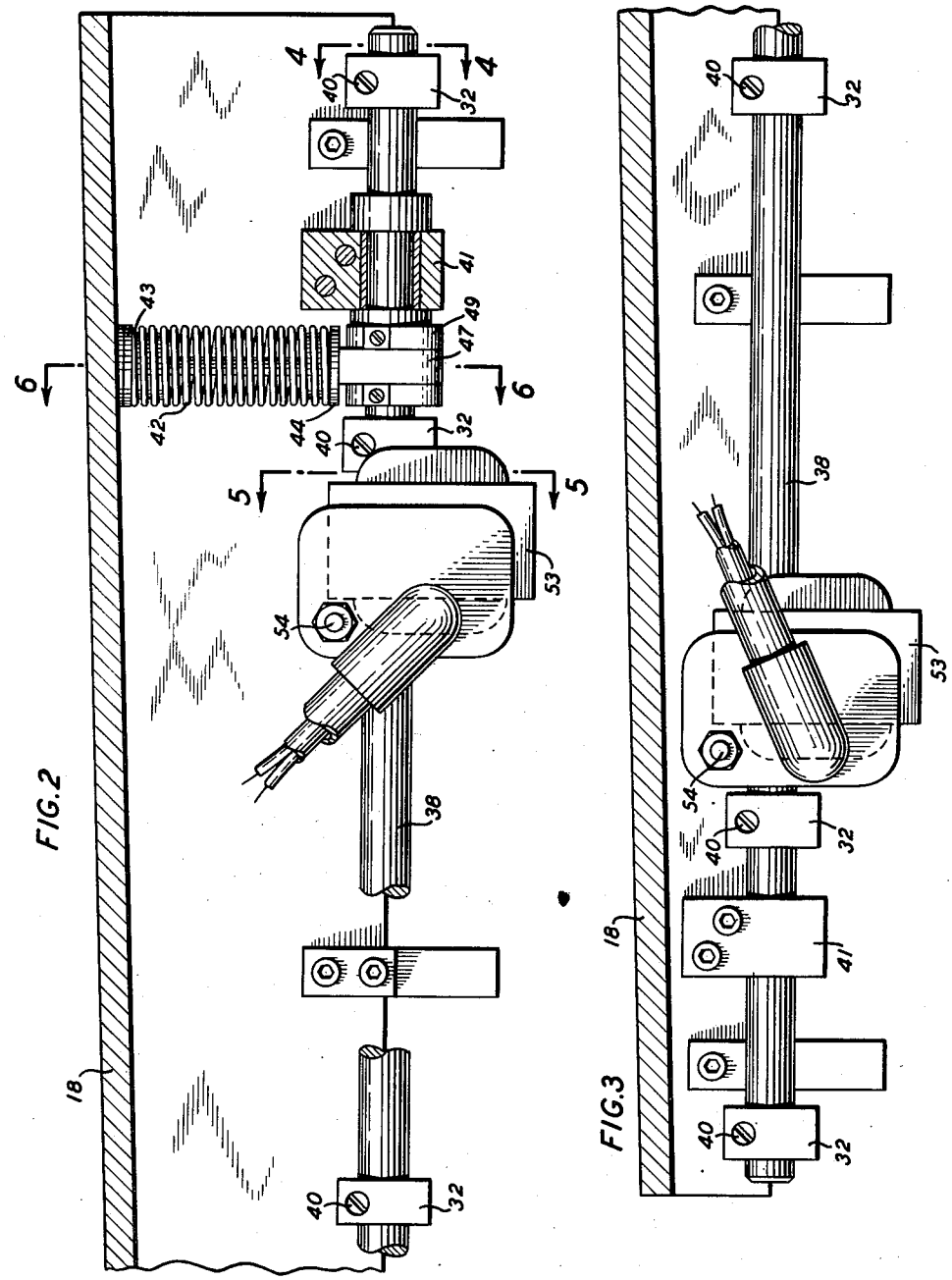

INVENTOR
A.A. WILLIAMS
BY
ATTORNEY

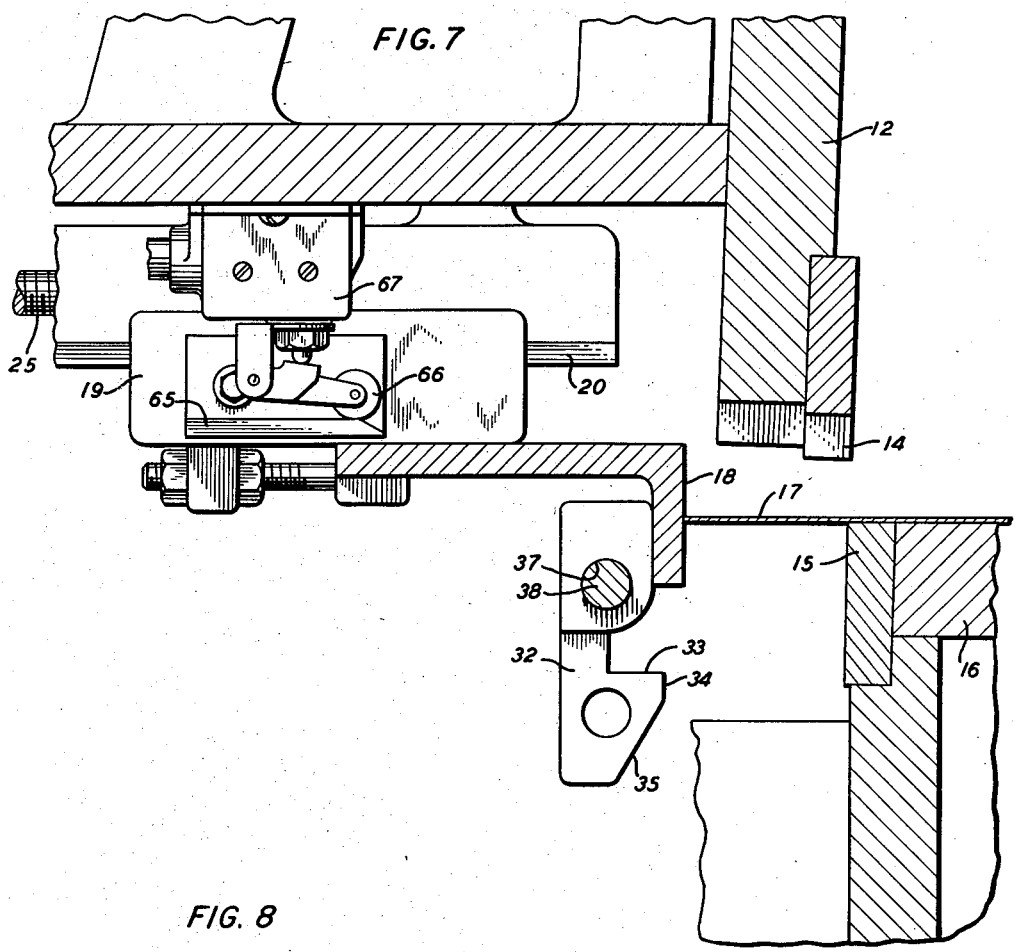

Patented July 15, 1952

2,603,291

UNITED STATES PATENT OFFICE 2,603,291

MATERIAL GUIDE FOR SHEARING MACHINES

Alfred A. Williams, Plainfield, N. J., assignor to Western Electric Company, Incorporated, New York, N. Y., a corporation of New York Application March 5, 1949, Serial No. 79,745

2 Claims. (Cl. 164—59)

This invention relates to material guides for shearing machines and has for its object the provision of a guide to assure movement of the leading end of thin or flexible material into engagement with the conventional stop whereby portions of predetermined lengths may be accurately sheared from the material.

In machines for shearing portions of predetermined lengths from sheet material, the material, short of the shearing blades, is usually supported in a given plane on a table, while the portions to be cut therefrom remain unsupported. When thin or flexible materials are to be sheared into portions of predetermined lengths, the lengths of these portions, when sheared in the conventional manner, may not be accurate owing to the fact that the unsupported leading end of the material may move out of alignment or flex of its own weight causing the material to extend through an arc to the standard stop, out of alignment with the main portion of the material supported by the table, resulting in portions greater than the predetermined lengths to be cut from the material.

With the aforementioned object in view, the invention comprises a material guide which may be readily incorporated in a shearing machine having a material supporting table, relatively movable shearing blades and the conventional stop which is movable relative to the end of the table and the shearing blades, distances determining the lengths of the portions which are to be sheared from the material. The material guide includes an element mounted for rocking movement adjacent the stop and having a tapered surface positioned to be engaged by the leading end of the material and guide it upwardly to a portion of the stop in a plane with the table whereby portions of predetermined lengths may be accurately sheared from the material.

More specifically, a plurality of the rocking elements are mounted at spaced positions on a rocking shaft mounted adjacent the stop and under the control of a solenoid, energizable during each operating cycle of the shearing blades whereby the rocking shaft with the elements, which are normally held in guiding positions by a spring, are moved about the axis of the shaft out of the path of the portion prior to the completion of the shearing operation.

Other objects and advantages will be apparent from the following detailed description when considered in conjunction with the accompanying drawings, wherein Fig. 1 is a vertical sectional view of a shearing machine embodying the material guide;

Figs. 2 and 3 are respectively enlarged fragmentary sectional views of the right and left halves of the material guides taken along the line 2/3—2/3 of Fig. 1;

Fig. 7 is an enlarged fragmentary vertical sectional view of a portion of the material guide and the shearing machine; and Fig. 8 is a wiring diagram of the electrical circuits controlling the material guide.

Figure 1:
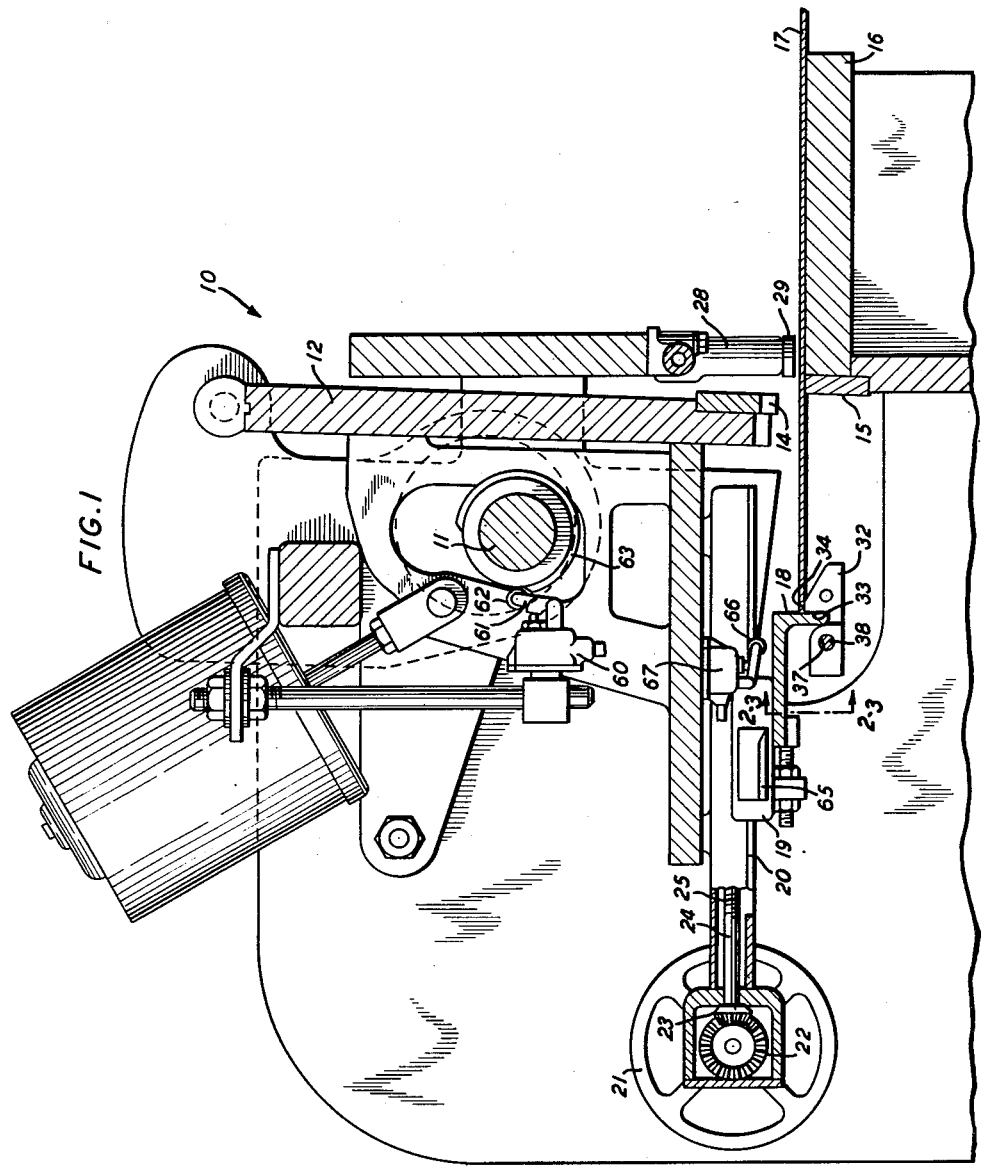

Referring now to the drawings, the shearing machine indicated generally at 10, in which the material guide is incorporated, includes a crank shaft 11 rotatable by a suitable power means (not shown) to reciprocate a holder 12 of a movable shearing blade 14 relative to a fixed position shearing blade 15. The shearing blade 15 is mounted at the edge of a table 16 which supports material 17 in a given plane in advance of the shearing blades as it is advanced intermittently between the shearing blades to a stop 18. The stop 18 is supported by a carriage 19, the carriage in turn being supported for longitudinal movement on a track 20. The carriage is movable on the track by the conventional adjusting mechanism including a rotatable hand wheel 21 for driving a beveled gear 22, which drives a companion beveled gear 23 on a shaft 24. The shaft 24 has a threaded portion 25 extending through an internally threaded nut (not shown) which is a fixed part of the carriage 19. Rotation of the hand wheel 21 will move the stop 18 toward or away from the shearing blades and the table. The conventional material clamp 28 has a pad 29 to engage the material 17 short of the shearing blades and hold it against movement. The material clamp 28 is actuated from the crank shaft 11 by a suitable cam (not shown) to free the material 17 after the shearing operation, but to hold the material against movement after it has been advanced to engage the stop 18 just prior to the shearing operation.

Figure 4:
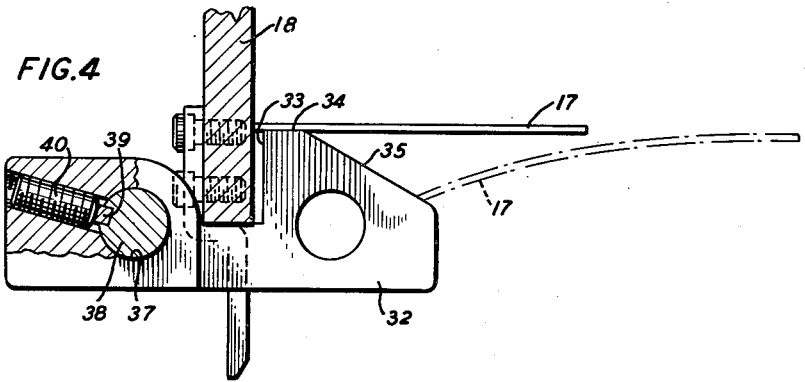
Fig. 4 is an enlarged detailed sectional view taken along the line 4—4 of Fig. 2.
Figure 5:
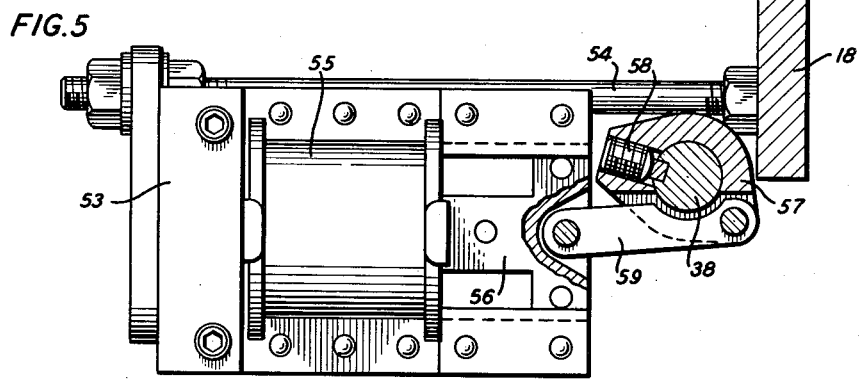
Fig. 5 is an enlarged detailed sectional view taken along the line 5—5 of Fig. 2.

The material guide includes a plurality of material guiding elements 32 which are identical in structure and are shown more in detail in Fig. 4. Each element 32 is cut away at 33 to extend around the under surface of the stop 18 as illustrated in Figs. 1 and 4, and when moved to engage the stop, a supporting surface 34 will be positioned in a plane with the top surface of the table 16. Inclined guiding surfaces 35 extending upwardly to the supporting surfaces are positioned to be engaged by the leading end of the material 17, should the material be flexible and bend downwardly of its own weight, as illustrated in broken lines of Fig. 4, while it is being moved longitudinally toward the stop 18. The material guiding elements 32 are apertured at 37 for mounting at spaced positions on a rocking shaft 38 where they are held against relative rotation by a key 39 and against axial movement by a set screw 40.

Figure 6:
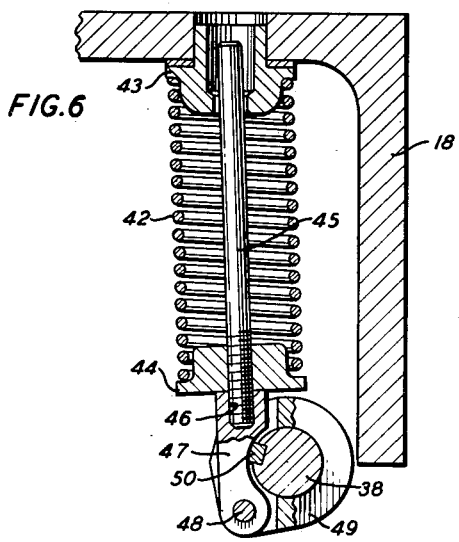
Fig. 6 is an enlarged detailed sectional view taken along the line 6—6 of Fig. 2.

The rocking shaft 38, supported by spaced bearings 41, is normally urged counterclockwise (Figs. 1, 4, 5 and 6) by a spring 42 disposed between an apertured holder 43 mounted in an aperture of the stop 18, as illustrated in Fig. 6, and a holder 44 threadedly mounted on a pin 45. The pin 45 extends vertically through the spring and into the aperture of the holder 43. The lower end of the pin 45 is threaded into an aperture 46 with a member 47, which is pivotally connected at 48 to a collar 49. The collar 49 is mounted on the rocking shaft 38 and secured against relative rotation thereon by a key 50. The variable force embodied in the spring 42 normally urges the rocking shaft 38 counterclockwise to move the guiding elements 32 into guiding positions relative to the stop 18 and to hold the elements in this position while the material is moved toward the stop.

A mechanism is provided to quickly rock the shaft 38 clockwise, a given distance sufficient to move the guide elements 32 away from the stop 18, as shown in Fig. 7, to allow the sheared portion of the material 17 to drop free of the machine. This mechanism includes solenoids 53 mounted at spaced positions longitudinally of the rocking shaft 38 as shown in Figs. 2 and 3. The solenoids 53 supported at 54 by the stop 18, include coils 55 and movable cores 56, the cores being connected to collars 57, fixedly mounted at 58 on the rocking shaft 38, by links 59. The solenoids are included in an electrical circuit which is under the control of a microswitch 60 (Fig. 1). The microswitch 60 has a cam lever 61 carrying a cam roller 62, positioned to be engaged by a cam 63 on the crank shaft 11 of the shearing machine, whereby the switch 60 will be operated into closed position during the shearing operation, preferably immediately after the shearing blade 14 starts the shearing of a portion from the material 17 or after the holder 29 has been moved into engagement with the material to hold the material against longitudinal movement.

If the stop 18 should be adjusted sufficiently close to the table for the cutting of very short portions from the material at which time the guiding elements would not be needed, a cam 65 mounted on the carriage 19 for the stop 18 would be moved to engage a cam roller 66 of a microswitch 67 as shown in Fig. 7. The switch 67, as shown in Figs. 7 and 8, is arranged to close the electrical circuit with the solenoids 53 and is normally open until the cam 65 moves it into the closed position causing energization of the solenoids 53 and holding them energized until the stop 18 is moved a sufficient distance away from the table to release the switch 67.

During operation of the shearing machine, the material 17 is fed over the top of the table 16 in a given plane toward the stop 18. At this time, the material guiding elements 32 are in their guiding positions with the surfaces 35 positioned to be engaged by the leading end of the material, and guide it upwardly where it will rest upon the surfaces 34 of the elements 32. In this manner the leading end of the material will engage the stop 18 in a plane with the plane of the upper surface of the table, positioning a measured length of the material to be cut by the shearing elements between the stop and the shearing blades. Before the material is cut by the shearing blades, the cam 63, Figs. 7 and 8, will have actuated the switch 60 into closed position energizing the solenoids 53 to rock the shaft 38 clockwise, simultaneously moving all of the guiding elements 32 out of a path required for the sheared portion of the material to drop freely from the shearing machine. The cam 63 will release the switch 60 for movement into open position to deenergize the solenoids 53 after completion of the shearing operation and the dropping of the portion 30 from the machine, whereby the spring 42 may be rendered effective to rock the shaft 38 counterclockwise to move all the elements 32 into their guiding positions. This operation continues throughout the operation of the shearing machine and assures accurate guiding of the material toward the stop 18, to cut portions of like lengths from the material and to remove the bend from the flexible measured length of the material prior to the shearing operation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A material guide for a shearing machine having relatively movable shearing blades, a table to support material in a given plane for movement between the blades, and a stop mounted at a position spaced from the table to be engaged by the leading end of the material to control the length of a portion to be sheared from the material, the material guide comprising an element having a material supporting surface to lie in the said plane when the element is in its guiding position, a guiding surface tapering upwardly to the supporting surface to be engaged by the leading end of the material, if flexed out of the said plane by its own weight while being moved toward the stop, and guide it into said plane on the supporting surface against the stop, whereby a portion equal in length to the distance in the said plane from the stop to the shearing line may be sheared from the material, a rocking shaft to support the element, an electrical unit, operatively connected to the shaft to rock the shaft to move the element away from the stop, when the unit is energized, an electrical circuit for the electrical unit, and a switch operated at a predetermined interval during each operating cycle of the machine to close the circuit to energize the unit.

2. A guide for sheet material being fed to a shearing machine having relatively movable shearing blades, a table to support the material in a given plane for movement between the blades, a stop to be engaged by the leading end of the material, and a carriage for the stop movable to move the stop relative to the shearing blades to vary the lengths of portions to be cut from the material, like rocking elements having material supporting surfaces to lie in the said plane when the elements are in their guiding positions, and guiding surfaces tapering upwardly to their supporting surfaces to be engaged by the leading end of the material, if flexed out of the said plane by its own weight while being moved toward the stop, and jointly guide it into said plane on the supporting surfaces against the stops whereby a portion equal in length to the distance in the said plane from the stop to the shearing line may be sheared from the material, a rocking shaft to support the elements at spaced positions, means normally urging rocking movement of the shaft in one direction to move the elements into guiding position and hold them in the said position, an electrical unit energizable to rock the shaft in another direction to move the elements away from the stop, an electrical circuit for the unit, a switch actuable to close the circuit to energize the unit for an interval of time during the shearing of the material, a normally open second switch for the circuit to cause energization of the unit when closed, and means movable with the carriage to actuate the second switch into closed position upon movement of the stop within a given short distance of the shearing blades to hold the unit energized.

ALFRED A. WILLIAMS.

REFERENCES CITED

The following references are of record in the file of this patent:

UNITED STATES PATENTS

| Number | Name | Date |
|---|---|---|
| 757,604 | Edwards | Apr. 19, 1904 |
| 1,347,536 | Downie | July 27, 1920 |
| 1,690,503 | Rhodes | Nov. 6, 1928 |
| 2,204,405 | Dunlap | June 11, 1940 |